No. 811,539. PATENTED FEB. 6, 1906.
R. E. BATES.
ELECTRICAL CONTROL SYSTEM.
APPLICATION FILED FEB. 1, 1905.
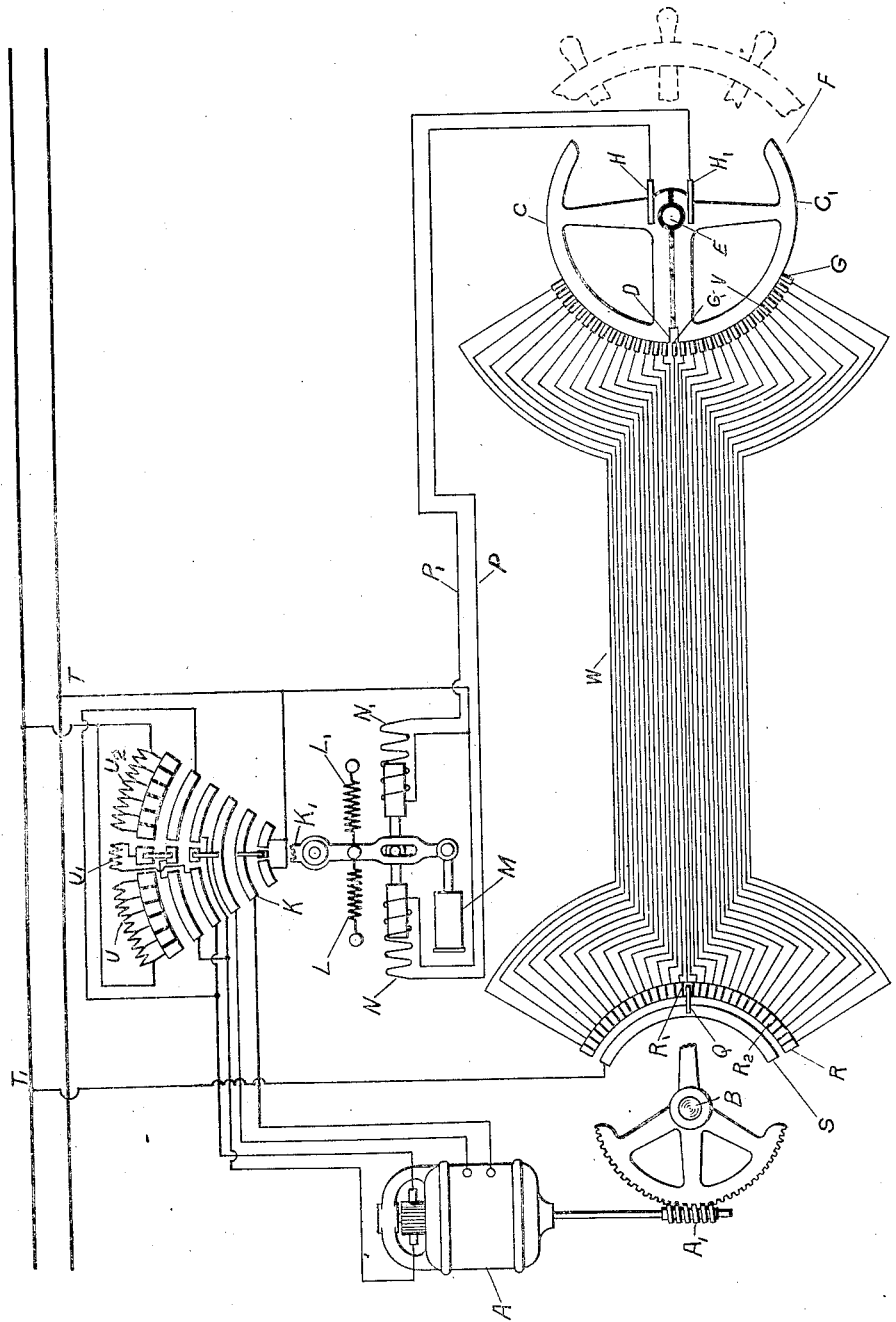
Witnesses
Birney Hines
Otto S. Schairer
Inventor
R. E. Bates.
by Shelly S. Carr, Atty

UNITED STATES PATENT OFFICE.

RALPH E. BATES, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL CONTROL SYSTEM.

No. 811,539.     Specification of Letters Patent.     Patented Feb. 6, 1906.

Application filed February 1, 1905. Serial No. 243,729.

*To all whom it may concern:*

Be it known that I, RALPH E. BATES, a citizen of the United States, and a resident of Wilkinsburg, in the county of Allegheny and State of Pennsylvania, have invented a new and useful Improvement in Electrical Control Systems, of which the following is a specification.

My invention relates to control systems for electric motors, and particularly to control systems for electric motors that operate the steering-gear of ships and similar mechanism.

My invention has for its object to provide a control system for electric motors by means of which the amount and direction of movement of the device operated by the motors may be accurately predetermined and governed.

The single figure of the accompanying drawing illustrates a system embodying my invention.

A motor A is operatively connected by gearing A' or otherwise to a rudder-post B or the shaft or movable part of any other device the movement of which is to be accurately governed. The circuits of the motor A are governed by a controller, such as that shown at K, by means of which the field-magnet and armature-circuits may be connected in proper relations for either forward or reverse direction of rotation of the armature and either the resistance U or the resistance U² be connected in series therewith when starting and progressively cut out. The same controller may also serve to connect the armature-winding in a local braking-circuit with a resistance U' when the contact-arm K' of the controller occupies its mid-position.

The contact-carrying arm K' of the controller K is operated by means of electromagnets N and N' and is maintained in mid-position when neither of the electromagnets is energized by means of springs L and L'. A dash-pot M is provided for preventing any sudden movement of the contact-carrying arm K' that might cause injury to the motor by reason of a too rapid reduction of the amount of resistance in the motor-circuit. One terminal of each of the windings of the electromagnets N and N' is connected to a distributing-conductor T, and the other terminals are connected, by means of conductors P and P', to brushes H and H', respectively, which engage conducting-sectors C and C' of a master controlling device F, that may be the pilot-wheel of a ship's steering-gear or a manually or automatically operated controller employed for any other suitable and desired purpose.

Conducting-sectors C and C' are suitably mounted upon a shaft E and are insulated from each other and separated at their outer circumferences by a gap D in order that all but one of a plurality of brushes or contact-terminals G may engage therewith. The terminals G are connected, by means of conductors W, to corresponding contact-terminals R, with which a brush Q, that is operated by the rudder-post or controlled shaft B, is adapted to engage. The brush Q also engages a conducting-sector S, that is connected with distributing-conductor T'.

If the controller F occupies the position shown in the drawings, the motor A remains at rest and the rudder or other controlled member occupies its mid-position. If, however, the controller or pilot-wheel F is moved in the one direction or the other, a circuit will be completed from the distributing-conductors T T' through either the winding of magnet N or that of magnet N', according to the direction of movement of said wheel, and the arm K' will be thereby actuated to start and regulate the operation of the motor A until the brush of finger Q makes engagement with that contact-terminal of the set R that is connected to the terminal of the set G, which is in line with the gap D', when the motor will stop. To illustrate, we will assume that the wheel F is operated to turn the sectors C and C' contraclockwise until the gap D is brought opposite the contact-terminal V. A circuit will be thus established from distributing-conductor T through the winding of electromagnet N, conductor P, brush H, conductor-segment C, contact-terminals G' and R', brush Q, and conducting-sector S to distributing-conductor T'. The energized electromagnet N operates controller-arm K', and the motor A is caused to rotate in the proper direction to move brush Q toward contact-terminal R², that is connected with contact-terminal V of controller F. During rotation of the shaft or post B the circuits remain similar to that just described, except that as the brush Q is moved toward contact-terminal R² the circuit is shifted progressively from one of conductors W to the next. When the brush Q comes into engagement with contact-terminal R², the circuit of electromagnet N is interrupted, owing to the fact that contact-terminal V, now occupying gap D, does not engage conducting-sector C of controller F, and the arm K' of controller K is therefore returned to its mid-position by the spring L' and the motor A stops.

The operation of the system is similar to that just described when the master-controller F is moved to any other position in the same direction, and when the controller F is moved in the opposite direction to that described the operation of the system is the same, except that the electromagnet N', the conductor P, the brush H', and the sector C' become effective, and the field-magnet and armature-circuits of the motor A are connected in such relation that the motor is caused to operate in the opposite direction.

I claim as my invention—

1. The combination with a source of electrical energy, a motor, a controlled member operated thereby, and a controller for said motor, of electromagnets for operating said controller, a master-controller comprising a plurality of terminal pieces, and conducting-segments that are respectively connected to the windings of said electromagnets and that are separated and insulated from each other and engage all but one of said terminal pieces, and a controller comprising a plurality of terminal pieces that are respectively connected to the terminal pieces of the master-controller, and means operated by said controlled member for making circuit connections with said terminal pieces, the circuits of the said magnet-windings being interrupted when connection is made with the terminal that is connected with the idle terminal of the aforesaid controller.

2. The combination with a source of electrical energy, a motor, a controlled member operated thereby, and a controller for said motor, of electromagnets for operating said controller, a master-controller comprising a plurality of terminal pieces and conducting-segments that are respectively connected to the windings of said electromagnets and that are separated and insulated from each other and engage all but one of said terminal pieces, and a controller comprising a plurality of terminal pieces that are respectively connected to the terminal pieces of the master-controller, and means operated by said controlled member for making circuit connections with said terminal pieces.

In testimony whereof I have hereunto subscribed my name this 28th day of January, 1905.

RALPH E. BATES.

Witnesses:
 OTTO S. SCHAIRER,
 BIRNEY HINES.